US012496825B2

(12) United States Patent
Kishigami

(10) Patent No.: US 12,496,825 B2
(45) Date of Patent: Dec. 16, 2025

(54) LIQUID DISCHARGING HEAD

(71) Applicant: BROTHER KOGYO KABUSHIKI KAISHA, Nagoya (JP)

(72) Inventor: Toshihiro Kishigami, Obu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 232 days.

(21) Appl. No.: 18/470,650

(22) Filed: Sep. 20, 2023

(65) Prior Publication Data

US 2024/0140093 A1 May 2, 2024

(30) Foreign Application Priority Data

Oct. 28, 2022 (JP) ................................ 2022-173582

(51) Int. Cl.

| | |
|---|---|
| ***B41J 2/14*** | (2006.01) |
| ***B41J 2/15*** | (2006.01) |
| ***B41J 2/155*** | (2006.01) |

(52) U.S. Cl.

CPC ............ *B41J 2/14233* (2013.01); *B41J 2/15* (2013.01); *B41J 2/155* (2013.01); *B41J 2002/14475* (2013.01)

(58) Field of Classification Search

CPC ...................................................... B41J 2/1433

See application file for complete search history.

(56) References Cited

U.S. PATENT DOCUMENTS

2006/0044360 A1* 3/2006 Sugahara ............ B41J 2/14233 347/68
2010/0214374 A1* 8/2010 Stephens ............. B41J 2/14233 347/74
2012/0069104 A1* 3/2012 Ikuechi ............... B41J 2/14209 347/85
2014/0160204 A1 6/2014 Fukuzawa et al.
2019/0061350 A1* 2/2019 Irokawa ................ B41J 2/1433
2019/0299609 A1* 10/2019 Sugiura ............... B41J 2/14201

FOREIGN PATENT DOCUMENTS

JP 2014113796 A 6/2014
WO WO-2010137435 A1 12/2010

* cited by examiner

*Primary Examiner* — Shelby L Fidler
(74) *Attorney, Agent, or Firm* — Element IP, PLC

(57) ABSTRACT

A liquid discharging head includes: a nozzle plate formed with a nozzle; a pressure chamber plate formed with a pressure chamber; and at least three connecting plates stacked in a stacking direction between the nozzle plate and the pressure chamber plate, the at least three connecting plates being formed with at least three holes which construct a connecting channel connecting the pressure chamber and the nozzle. The connecting channel has an enlarged diameter part in which a diameter of the connecting channel is enlarged from the pressure chamber toward the nozzle, the enlarged diameter part is constructed of the at least three holes formed in the at least three connecting plates, and diameters of the at least three holes are enlarged in an order from the pressure chamber toward the nozzle.

5 Claims, 7 Drawing Sheets

LIQUID DISCHARGING HEAD

REFERENCE TO RELATED APPLICATIONS

This application claims priority from Japanese Patent Application No. 2022-173582 filed on Oct. 28, 2022. The entire content of the priority application is incorporated herein by reference.

BACKGROUND ART

Conventionally, there is a known liquid discharging head including a channel member constructed of a plurality of plates which are stacked. A hole is formed in each of the plurality of plates of the channel member. Further, the respective plates are positioned with respect to each other so that the holes each of which is formed in one of the plurality of plates are communicated to each other so as to construct an individual channel. The individual channel includes a pressure chamber, a liquid discharging hole (nozzle), and a descender (connecting channel) connecting the pressure chamber and the liquid discharging hole. The descender is constructed of not less than three holes which are communicated with one another. Further, the descender has a narrowed part (hole) configured to attenuate or damp any pressure vibration in the descender occurring in a case that a liquid droplet is discharged from the liquid discharging hole. With this, it is possible to suppress any generation of a divided droplet divided from a liquid droplet which is being discharged by one time of a discharging operation.

DESCRIPTION

In the descender of the above-described liquid discharging head, however, an enlarged diameter part in which a hole diameter is enlarged further from the pressure chamber toward the liquid discharging hole is constructed of two holes which are a hole constructing the narrowed part and another hole adjacent to the narrowed part on a side of the liquid discharging hole. By constructing the enlarged diameter part, of the descender, of the two holes in this manner, there is a large difference between the diameters of the two holes. Due to this, in a case that an air bubble enters from the liquid discharging hole into the descender, the air bubble easily remains in a stepped part generated due to the above-described difference in the hole diameters in the descender. As a result, there occurs such a problem of non-discharge of a liquid droplet, in a case that the liquid droplet is being discharged from the liquid discharging hole, due to the air bubble remaining in the stepped part.

In view of the above-described situation, an object of the present disclosure is to provide a liquid discharging head capable of suppressing generation of a divided droplet by attenuating the pressure vibration and of suppressing occurrence of the non-discharge.

According to an aspect of the present disclosure, there is provided a liquid discharging head, including: a nozzle plate formed with a nozzle; a pressure chamber plate formed with a pressure chamber; and at least three connecting plates stacked in a stacking direction between the nozzle plate and the pressure chamber plate, the at least three connecting plates being formed with at least three holes which construct a connecting channel connecting the pressure chamber and the nozzle, wherein the connecting channel has an enlarged diameter part in which a diameter of the connecting channel is enlarged from the pressure chamber toward the nozzle, the enlarged diameter part is constructed of the at least three holes formed in the at least three connecting plates, and diameters of the at least three holes are enlarged in an order from the pressure chamber toward the nozzle.

According to the liquid discharging head of the present disclosure, it is possible to suppress the generation of a divided droplet by attenuating the pressure vibration, with the enlarged diameter part of the connecting channel. Further, the enlarged diameter part is constructed of the at least three holes of which diameters are enlarged in an order from the pressure chamber toward the nozzle. Owing to this, the difference in the diameters between two adjacent holes, among the at least three holes constructing the enlarged diameter part, becomes small. Accordingly, even in a case that an air bubble enters from the nozzle into the connecting channel, the air bubble is less likely to remain in the stepped part generated due to the above-described difference in the hole diameters in the connecting channel, thereby making it possible to suppress the occurrence of a non-discharge of a liquid droplet in a case that the liquid droplet is being discharged.

Figure 4A:
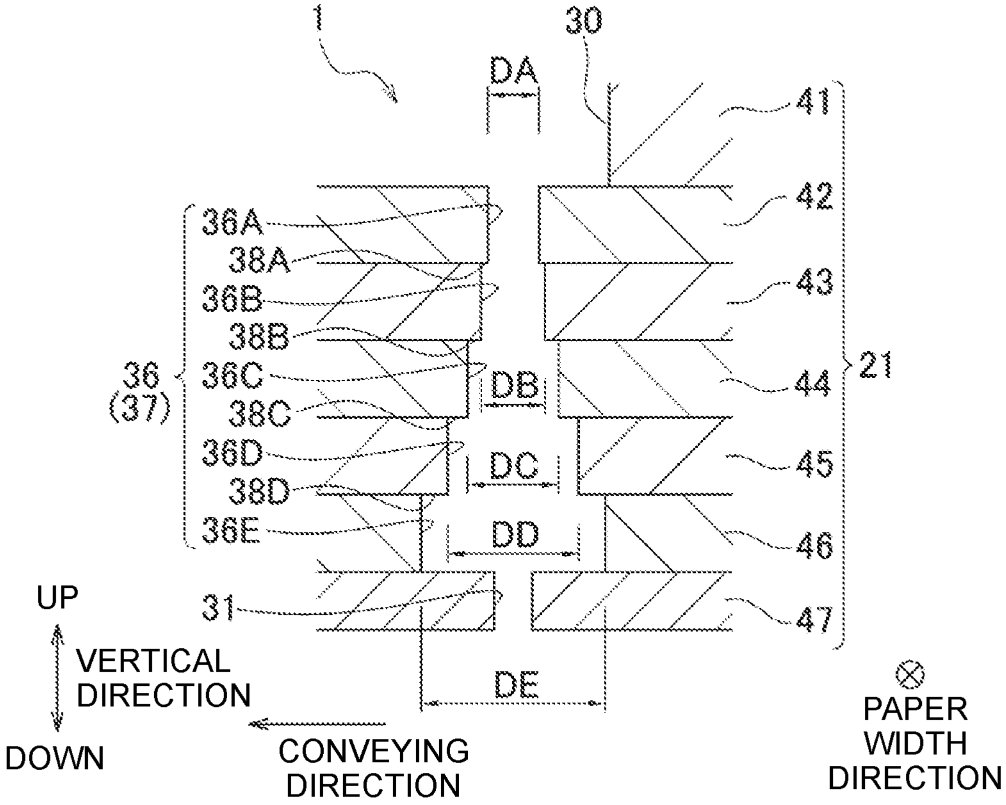
FIG. 4A is an enlarged cross-sectional view of a connecting channel and the surrounding thereof.
Figure 5A:
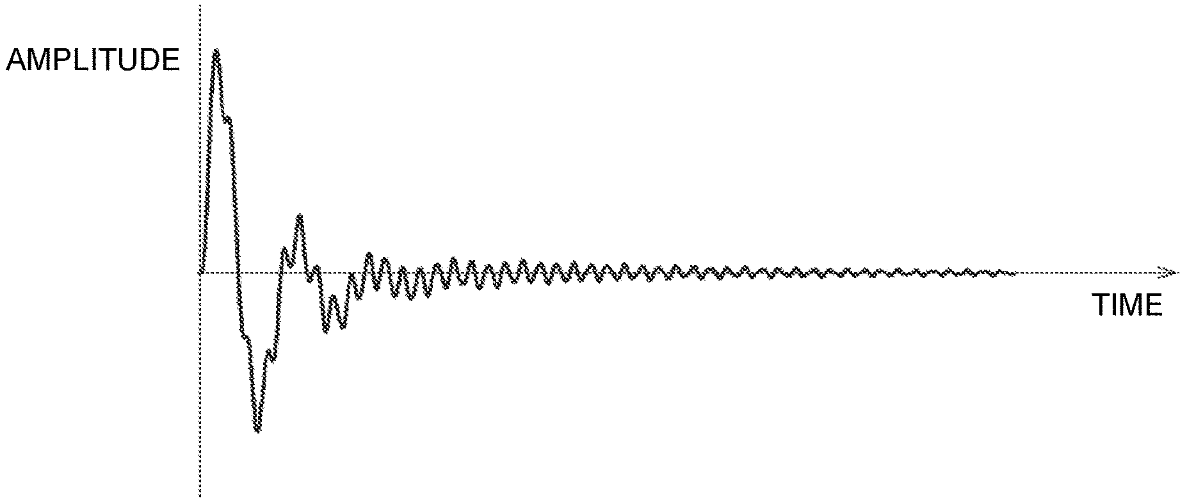
Figure 5B:
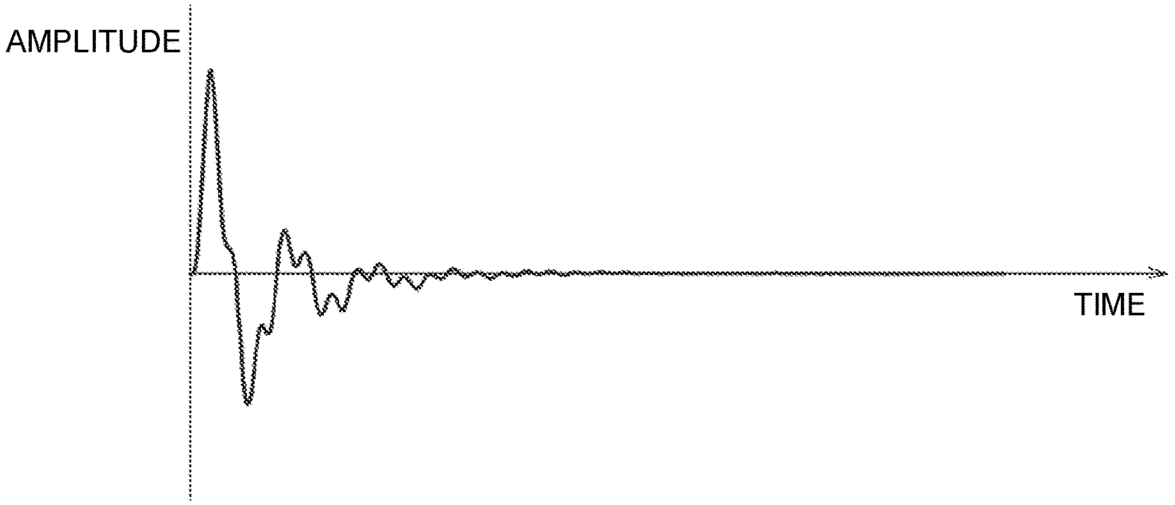

FIG. 5A is a view indicating an attenuation state of a pressure vibration in an ink meniscus in the vicinity of the nozzle in a case that the diameter of the connecting channel is constant over an entire length of the connecting channel, and FIG. 5B is a view indicating an attenuation state of a pressure vibration in the ink meniscus in the vicinity of the nozzle in a case of the connecting channel depicted in FIG. 4A.

Figure 6A:
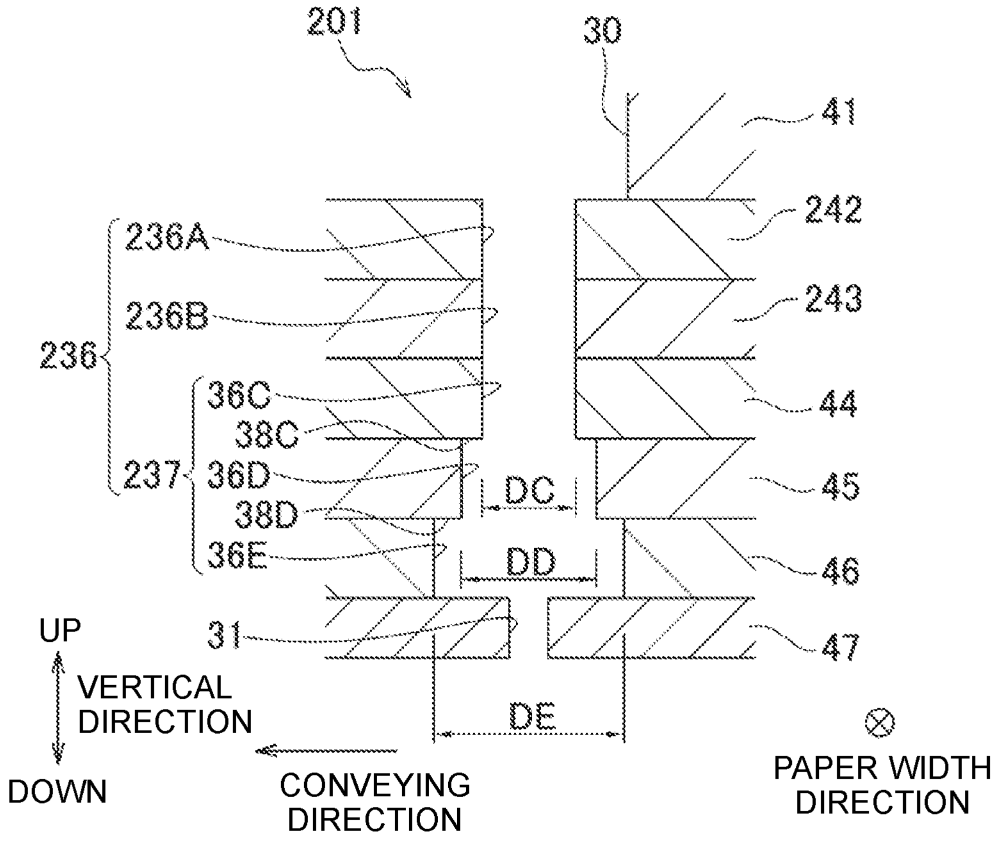
Figure 6B:
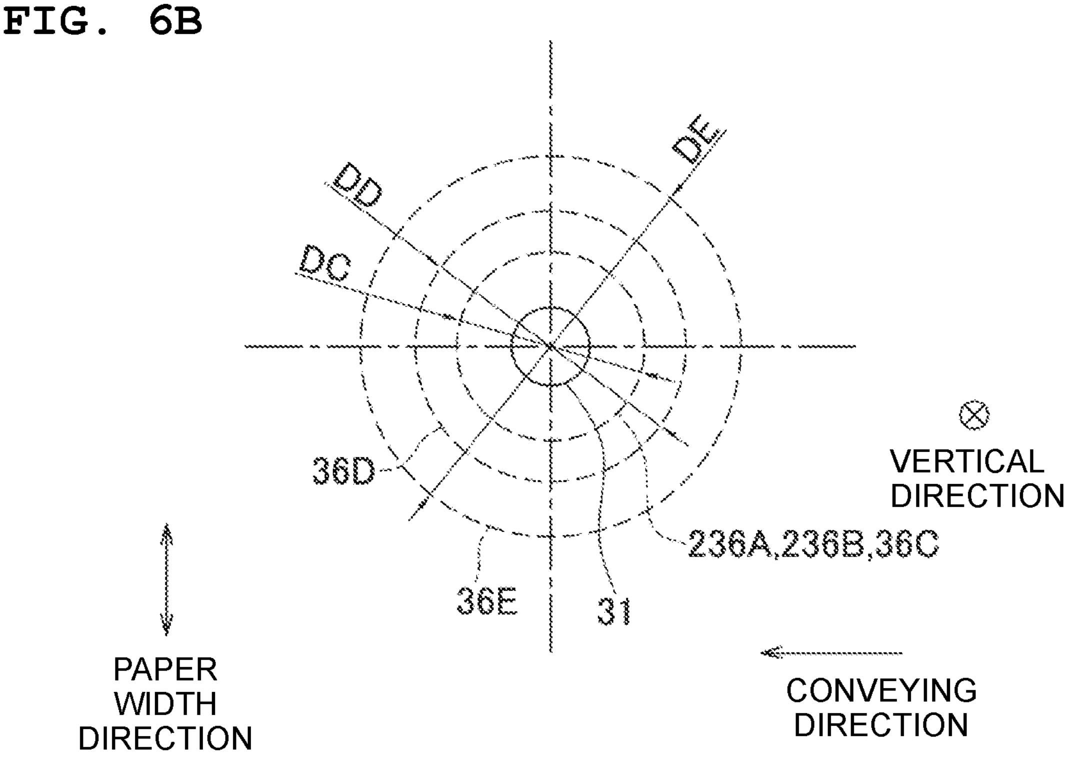

FIG. 6A is an enlarged cross-sectional view of a connecting channel and the surrounding thereof of a head according to a second embodiment of the present disclosure, and FIG. 6B is a plane view of main parts or components depicting a nozzle and the connecting channel in a case that the nozzle is seen from below.

Figure 7A:
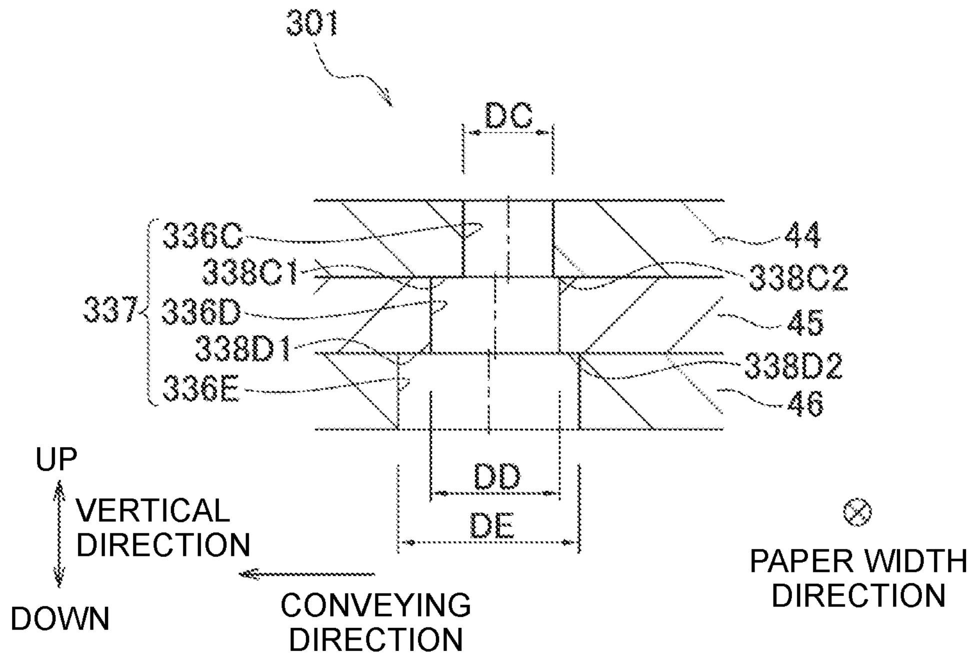
Figure 7B:
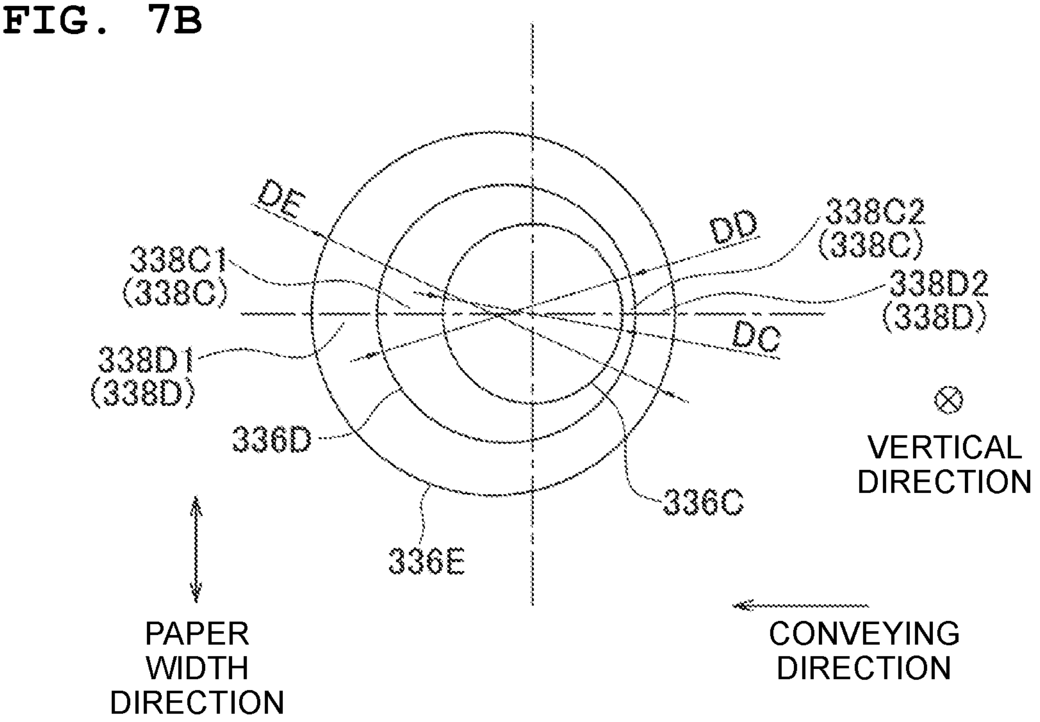

FIG. 7A is a cross-sectional view of main parts of a connecting channel of a head according to a third embodiment of the present disclosure, and FIG. 7B is a view of the connecting channel depicted in FIG. 7A in a case that the connecting channel is seen from below.

FIRST EMBODIMENT

Figure 1:
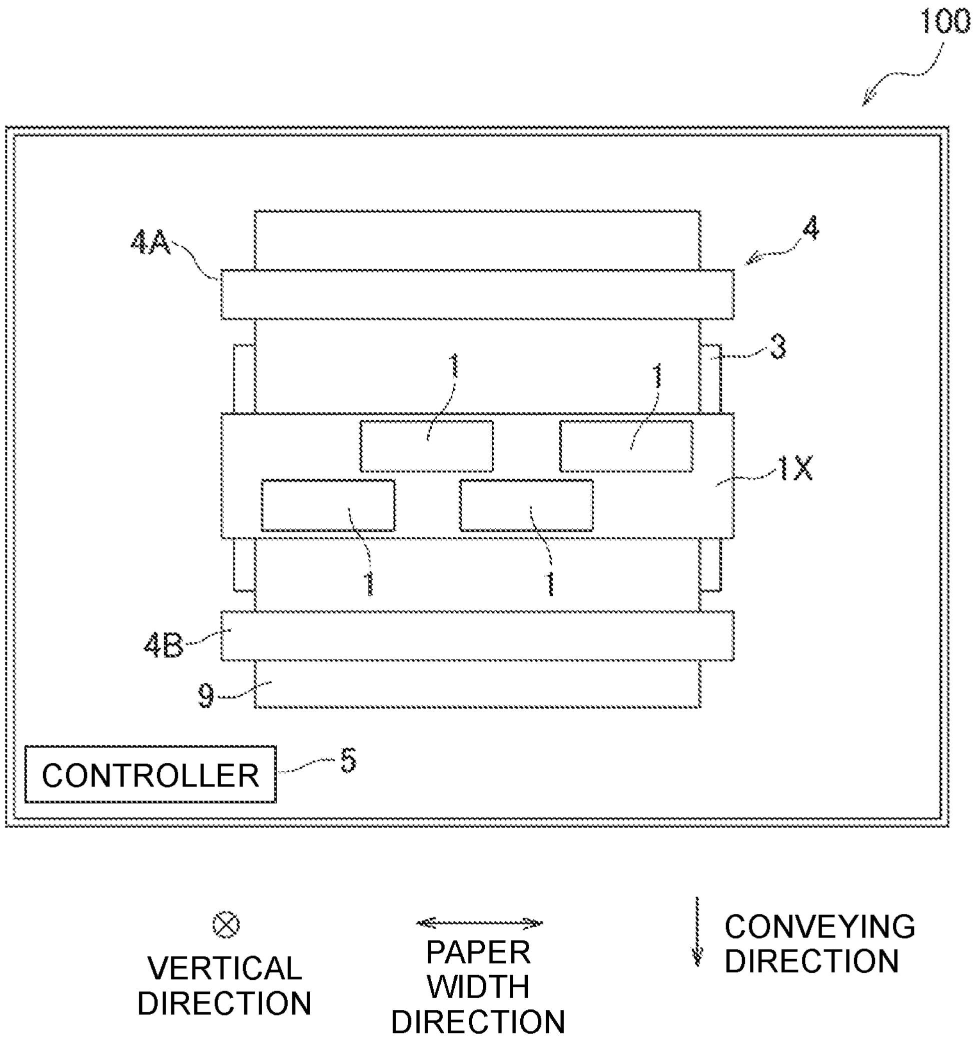
FIG. 1 is a schematic plan view of a printer including a head according to a first embodiment of the present disclosure.

A head 1 according to a first embodiment of the present disclosure is provided on a printer 100, as depicted in FIG. 1. The printer 100 is provided with a head unit 1X including four pieces of the head 1, a platen 3, a conveying mechanism 4 and a controller 5.

The head unit 1X is elongated in a paper width direction, and is of a line system which discharges ink from a nozzle 31 (see FIGS. 2 and 3) with respect to a paper sheet 9 in a state that a position of the head unit 1X is fixed. Four pieces of the head 1 are each elongated in the paper width direction, and are arranged in a staggered manner in the paper width direction. The paper width direction is a direction orthogonal to a vertical direction.

The platen 3 is a flat plate member which is arranged below the head unit 1X, and which extends in a direction orthogonal to the vertical direction. The platen 3 supports, by an upper surface thereof, the paper sheet 9 from below.

The conveying mechanism 4 has two roller pairs 4A and 4B which are arranged while sandwiching the platen 3 therebetween in a conveying direction. The conveying direction is a direction orthogonal to the vertical direction and the paper width direction. In a case that a conveying motor (not depicted in the drawings) is driven by a control of the controller 5, the two roller pairs 4A and 4B rotate while nipping the paper sheet 9 therebetween. With this, the paper sheet 9 is conveyed in the conveying direction.

The controller 5 has a ROM, a RAM and an ASIC. The ASIC executes a recording processing, etc., in accordance with a program stored in the ROM. In the recording processing, the controller 5 controls the conveying motor (not depicted in the drawings) and a driver IC (not depicted in the drawings) of each head 1, based on a recording instruction (including image data) inputted from an external apparatus such as a personal computer (PC), etc., so as to perform conveyance of the paper sheet 9 by the conveying mechanism 4 and discharge of the ink toward the paper sheet 9 by each head 1, thereby recording an image on the paper sheet 9.

Figure 2:
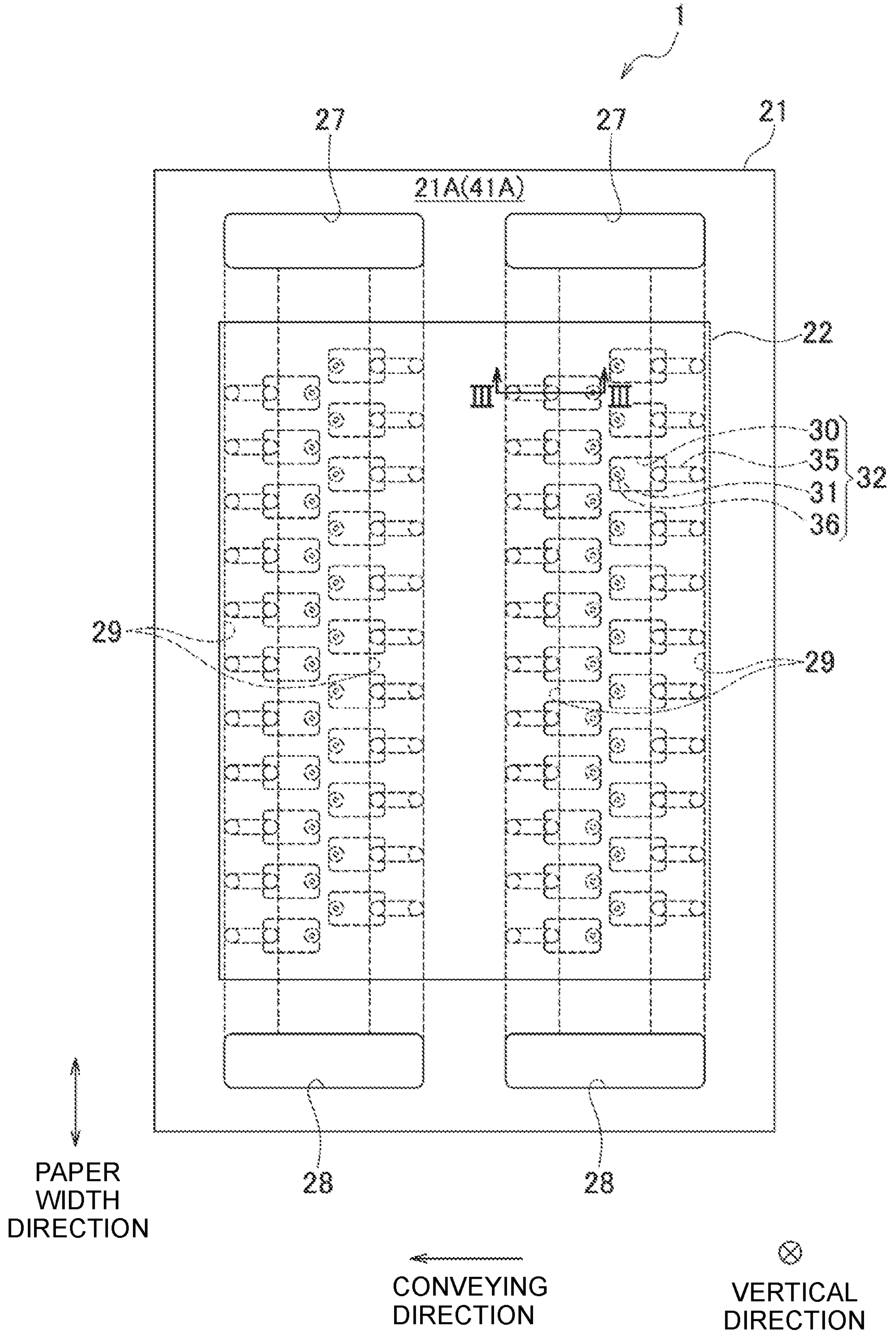
FIG. 2 is a plane view of the head depicted in FIG. 1.
Figure 3:
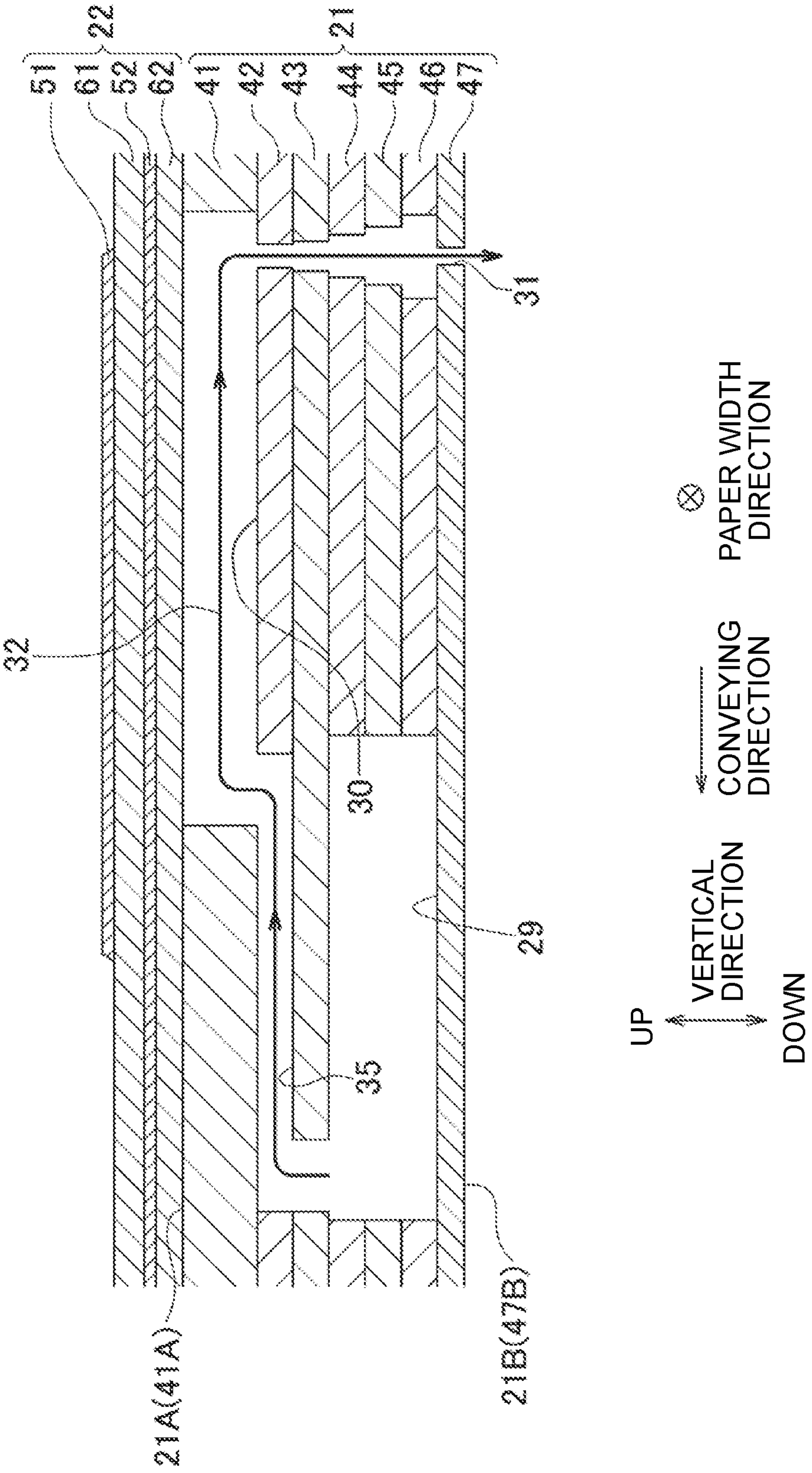
FIG. 3 is a cross-sectional view taken along a line of FIG. 2.

Next, the configuration of each of the four heads 1 will be explained. Each of the four heads 1 corresponds to a "liquid discharging head" of the present disclosure. As depicted in FIGS. 2 and 3, each of the four heads 1 includes a channel member 21 and an actuator member 22 arranged on an upper surface 21A of the channel member 21.

As depicted in FIG. 3, the channel member 21 is constructed of seven plates 41 to 47. The plates 41 to 47 are stacked on one another in the vertical direction (a thickness direction of each of the plates 41 to 47).

A plurality of pressure chambers 30 is formed in the plate 41. Each of the pressure chambers 30 is constructed of a hole formed in the plate 41. A plurality of nozzles 31 is formed in the plate 47. Each of the nozzles 31 is constructed of a hole formed in the plate 47. An upper surface 41A of the plate 41 corresponds to the upper surface 21A of the channel member 21, and a lower surface 47B of the plate 47 corresponds to a lower surface 21B of the channel member 21. The pressure chambers 30 are opened in the upper surface 21A, and the nozzles 31 are opened in the lower surface 21B. The lower surface 21B is also referred to as a "nozzle surface".

The five plates 42 to 46 are stacked between the plate 41 and the plate 47. Among the five plates 42 to 46, the three plates 44 to 46 are formed with four common channels 29 (see FIG. 2). Among the five plates 42 to 46, the two plates 42 and 43 are formed with, for each of the pressure chambers 30, a communicating channel 35 which communicate each of the pressure chambers 30 and one of the four common channels 29. The five plates 42 to 46 are formed with, for each of the pressure chambers 30, a connecting channel 36 (see FIG. 4) which connects each of the pressure chambers 30 and one of the nozzles 31.

The connecting channel 36 is constructed of five holes 36A to 36E, as depicted in FIG. 4A. The five holes 36A to 36E are formed, respectively, in the five plates 42 to 46. In the present embodiment, each of the holes 36A to 36E has a cylindrical shape, and a channel cross section (in the present embodiment, a cross section along the direction orthogonal to the vertical direction) of each of the holes 36A to 36E is circular. Each of the holes 36A to 36E is defined by a side wall along the vertical direction (the "stacking direction" of the present disclosure). Each of the holes 36A to 36E has no stepped part in the side wall, and has a constant diameter.

Diameters DA to DE, respectively, of the five holes 36A to 36E are mutually different. Namely, channel cross sectional areas (in the present embodiment, cross sectional areas along the direction orthogonal to the vertical direction) of the connecting channel 36 are mutually different in the respective holes 36A to 36E. The diameters DA to DE of the five holes 36A to 36E are enlarged (made to become greater) in an order from the pressure chamber 30 toward the nozzle 31.

The diameters DA to DE of the five holes 36A to 36E satisfy a relationship: Diameter DB-Diameter DA < Diameter DC-Diameter DB; Diameter DC-Diameter DB < Diameter DD-Diameter DC; and Diameter DD-Diameter DC < Diameter DE-Diameter DD. Namely, for example, a value obtained by subtracting the diameter DD of the hole 36D formed in the plate 45 from the diameter DE of the hole 36E formed in the plate 46 is greater than a value obtained by subtracting the diameter DC of the hole 36C formed in the plate 44 from the diameter DD of the hole 36D formed in the plate 45. Further, the diameter DA of the hole 36A formed in the plate 42 is not more than ½ of (half) the diameter DE of the hole 36E formed in the plate 46.

The plate 41 corresponds to a "pressure chamber plate" of the present disclosure. The plate 47 corresponds to a "nozzle plate" of the present disclosure. Each of the plates 42 to 46 corresponds to a "connecting plate" of the present disclosure. Note that the plate 46 corresponds to a "first connecting plate" of the present disclosure. The plate 45 corresponds to a "second connecting plate" of the present disclosure. The plate 44 corresponds to a "third connecting plate" of the present disclosure.

Further, as depicted in FIG. 4A, the connecting channel 36 has an enlarged diameter part 37 in which a hole diameter is enlarged from the pressure chamber 30 toward the nozzle 31. The enlarged diameter part 37 in the present embodiment is formed over an entire length of the connecting channel 36 in the vertical direction. Namely, the enlarge diameter part 37 is constructed of the five holes 36A to 36E.

Figure 4B:
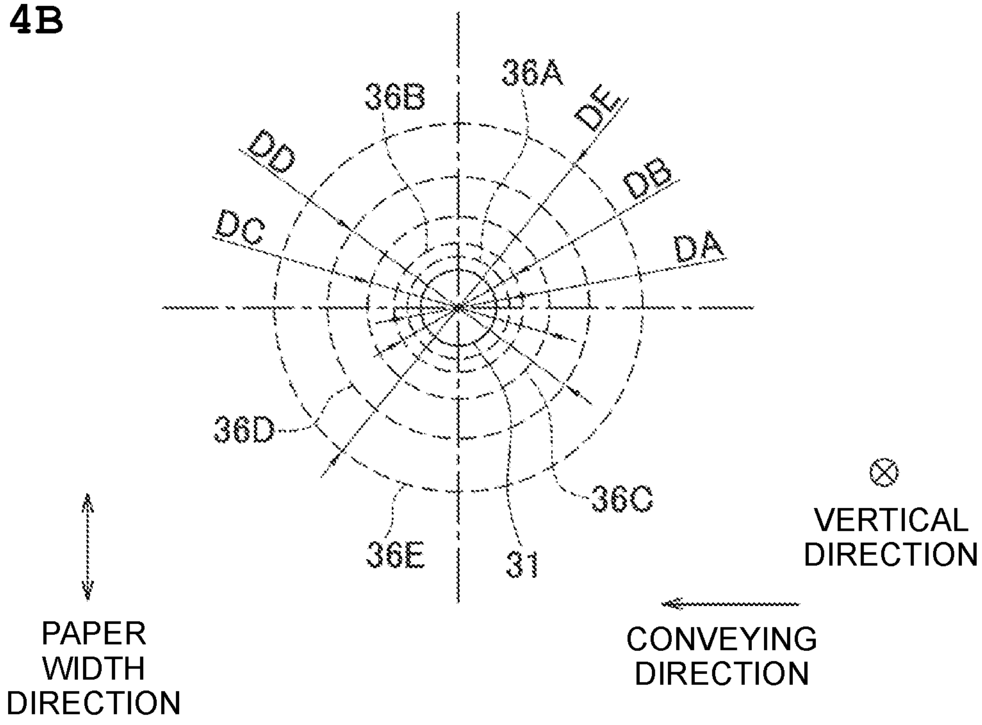
FIG. 4B is a plane view of main parts depicting a nozzle and the connecting channel in a case that the nozzle is seen from below.

Further, as depicted in FIG. 4B, the centers of the five holes 36A to 36E constructing the connecting channel 36 are coincident with one another and the five holes 36A to 36E are arranged so as to overlap with one another along the vertical direction. More specifically, among the five holes 36A to 36E, in two holes adjacent to each other in the vertical direction, an entirety of a hole having a smaller diameter overlaps with a hole having a larger diameter in the vertical direction. Namely, for example, the entirety of the hole 36D overlaps with the hole 36E in the vertical direction, and the entirety of the hole 36C overlaps with the hole 36D in the vertical direction.

As depicted in FIG. 2, each of the four common channels 29 extends in the paper width direction and the four common channels 29 are arranged side by side in the conveying direction. Each of the four common channels 29 is provided with respect to a pressure chamber row constructed of the pressure chambers 30 aligned in the paper width direction. Four pressure chamber rows are arranged side by side in the conveying direction. The ink is supplied, via the communicating channel 35 (see FIG. 3), from one of the four common channels 29 to each of the pressure chambers 30 belonging to one of the four pressure chamber rows. Further, each of actuators of the actuator member 22 is deformed (as will be described later on), thereby applying pressure to the ink in one of the pressure chambers 30, which in turn causes the ink to pass through the connecting channel 36 and an ink droplet to be discharged from one of the nozzles 31.

In such a manner, the four common channels 29 and a plurality of individual channels 32 communicating with each of the four common channels 29 are formed in the channel member 21. Each of the individual channel 32 is a channel including the nozzle 31 and the pressure chamber 30, and is a channel starting from an outlet of one of the common channels 29 and reaching to the nozzle 31 via the communicating channel 35, the pressure chamber 30 and the connecting channel 36.

As depicted in FIG. 2, two supply ports 27 and two return ports 28 are formed in the upper surface 21A of the channel member 21. The two supply ports 27 are arranged on one side in the paper width direction with respect to the four common channels 29. The two return ports 28 are arranged on the other side in the paper width direction with respect to the four common channels 29. Each of the supply ports 27 and the return ports 28 is communicated with an ink tank (not depicted in the drawings) via a tube, etc. Each of the supply ports 27 is communicated with two common channels 29 adjacent to each other in the conveying direction, and supplies the ink from the ink tank to the two common channels 29. Each of the return ports 28 is communicated with two common channels 29 adjacent to each other in the conveying direction, and causes the ink to return from the two common channels 29 to the ink tank.

The actuator member 22 is arranged at the center in the upper surface 21A of the channel member 21. The actuator member 22 does not cover the supply ports 27 and the return ports 28 but covers all of the pressure chambers 30 opened in the upper surface 21A. As depicted in FIG. 3, the actuator member 22 includes a piezoelectric body 61, a vibration plate 62, a common electrode 52 and a plurality of individual electrodes 51. The piezoelectric body 61, the vibration plate 62 and the common electrode 52 define an outer shape of the actuator member 22 depicted in FIG. 2. The outer shape of the actuator member 22 (each of the piezoelectric body 61, the vibration plate 62 and the common electrode 52) has a rectangular shape which is one size smaller than the channel member 21 as seen from the vertical direction. On the other hand, each of the individual electrodes 51 is provided on one of the pressure chambers 30 and overlaps with one of the pressure chambers 30 in the vertical direction.

The vibration plate 62 is arranged on the upper surface 21A of the channel member 21. The common electrode 52 is arranged on an upper surface of the vibration plate 62. The piezoelectric body 61 is arranged on an upper surface of the common electrode 52. The individual electrodes 51 are arranged on an upper surface of the piezoelectric body 61.

The individual electrodes 51 and the common electrode 52 are electrically connected to the driver IC (not depicted in the drawings). The driver IC maintains the potential of the common electrode 52 at the ground potential, whereas the driver IC changes the potential of each of the individual electrodes 51 between a predetermined driving potential and the ground potential. In this situation, a part of the vibration plate 62 and a part of the piezoelectric body 61 (an actuator) which are sandwiched between each of the individual electrodes 51 and one of the pressure chambers 30 corresponding thereto are deformed so as to project toward the pressure chamber 30, thereby changing the volume of the pressure chamber 30 and imparting the pressure to the ink in the pressure chamber 30. The ink flows through the connecting channel 36 and is discharged from one of the nozzles 31 corresponding to the pressure chamber 30. Concurrently with this, the ink in one of the four common channels 29 flows through the communicating channel 35 and is supplied to the pressure chamber 30, and the ink is supplied from the ink tank to the common channel 29.

As described above, according to the present embodiment, the connecting channel 36 has the enlarged diameter part 37 in which the hole diameter is enlarged from the pressure chamber 30 toward the nozzle 31. With this, it is possible to effectively attenuate the pressure vibration occurring in a case that an ink droplet is discharged from the nozzle 31. In a case that the diameter of the connecting channel is constant over the entire length of the connecting channel and that the actuator is deformed to thereby discharge an ink droplet from the nozzle, although the pressure vibration occurring in the ink meniscus in the vicinity of the nozzle is gradually attenuated as the time passes, as depicted in in FIG. 5A, it requires a period of time to a certain extent (length) until the pressure vibration is attenuated to such an extent that the pressure vibration does not affect a next ink discharge. However, in the connecting channel 36 in the present embodiment, in a case that the ink droplet is discharged from the nozzle 31 as a same condition, it is possible to attenuate the pressure vibration occurring in the ink meniscus in the vicinity of the nozzle 31 for a short period of time, without weakening the pressure generated by the ink discharge, as depicted in FIG. 5B. By attenuating the pressure vibration by such an enlarged diameter part 37 of the connecting channel 36, it is possible to suppress the generation of a divided droplet which is different from a desired ink droplet.

Further, the enlarged diameter part 37 is constructed of the five holes 36A to 36E. By constructing the enlarged diameter part 37 by at least three holes which are the holes 36A to 36E, the difference in the diameters between two adjacent holes which are adjacent to each other becomes small. Namely, as depicted in FIG. 4A, each of a stepped part 38A generated by the difference between the diameter DA of the hole 36A and the diameter DB of the hole 36B, a stepped part 38B generated by the difference between the diameter DB of the hole 36B and the diameter DC of the hole 36C, a stepped part 38C generated by the difference between the diameter DC of the hole 36C and the diameter DD of the hole 36D, and a stepped part 38D generated by the difference between the diameter DD of the hole 36D and the diameter DE of the hole 36E becomes small. Owing to this, even in a case that an air bubble enters from the nozzle 31 into the connecting channel 36, the air bubble is less likely to remain in the stepped parts 38A to 38D.

Assume such a configuration wherein the hole 36D of the plate 45 is formed to have a same diameter as that of the hole 36E of the plate 46, and the enlarged diameter part of the connecting channel is constructed only of the holes 36C and 36D of the two plates 44 and 45, the difference between the diameter of the hole 36C and the diameter of the hole 36D becomes great, and thus the stepped part 38C becomes great. In a case that the stepped part 38C becomes great, an air bubble is more likely to remain in the stepped part 38C. In contrast, the enlarged diameter part 37C of the present embodiment has the at least three holes 36C to 36E. The diameters DC to DE of the at least three holes 36C to 36E are enlarged in the order from the pressure chamber 30 toward the nozzle 31, thereby making the difference between the diameters of the two adjacent holes to be small.

Since the connecting channel 36 has such an enlarged diameter part 37, even in a case that an air bubble enters from the nozzle 31 into the connecting channel 36, the air bubble is less likely to remain in each of the stepped parts 38A to 38D generated due to the above-described difference in the hole diameters. As a result, in a case that the liquid droplet is being discharged from the nozzle 31, it is possible to suppress any occurrence of a non-discharge of the ink droplet which would be otherwise occurred, for example, due to the nozzle 31 being clogged by the air bubble.

The enlarged diameter part 37 is formed over the entire length of the connecting channel 36. With this, the air bubble is less likely to remain in the entirety of the connecting channel 36. In addition, an effect of attenuating the pressure vibration in the case of discharging the ink droplet from the nozzle 31 is further enhanced, as compared with a case in which the enlarged diameter part 37 is formed only in a part of the connecting channel 36.

Further, the value obtained by subtracting the diameter DD of the hole 36D formed in the plate 45 from the diameter DE of the hole 36E formed in the plate 46 is greater than the value obtained by subtracting the diameter DC of the hole 36C formed in the plate 44 from the diameter DD of the hole 36D formed in the plate 45. With this, a ratio by which the hole diameter becomes great is higher as approaching toward the nozzle 31. Owing to this, the effect of attenuating the pressure vibration in the case of discharging the ink droplet from the nozzle 31 is further enhanced.

Furthermore, the diameter DA of the hole 36A formed in the plates 42 is not more than ½ of (half) the diameter DE of the hole 36E formed in the plate 46. Owing to this, the effect of attenuating the pressure vibration in the case of discharging the ink droplet from the nozzle 31 is further enhanced.

SECOND EMBODIMENT

Next, a head 201 according to a second embodiment of the present disclosure will be explained, with reference to FIGS. 6A and 6B.

The connecting channel 36 of the head 1 in the first embodiment has the enlarged diameter part 37 formed over the entire length of the connecting channel 36, as depicted in FIG. 4A. In contrast, the head 201 in the second embodiment has a plate 242 and a plate 243 in which a hole 236A and a hole 236B each having a same diameter as that of the hole 36C are respectively formed, instead of the above-described plates 42 and 43. Further, a connecting channel 236 of the head 201 is constructed of the holes 236A and 236B and of the above-described holes 36C to 36E, and an enlarged diameter part 237 is constructed of three holes which are the holes 36C to 36E. Constitutive components according to the second embodiment, which are the same as or equivalent to the constitutive components according to the first embodiment, are designated by the same reference numerals as those of the first embodiment, and any detailed explanation of which will be omitted.

The enlarged diameter part 237 is constructed of the three holes 36C to 36E in which the hole diameters are enlarged in an order from the pressure chamber 30 toward the nozzle 31. Owing to this, it is possible to obtain a similar effect as that obtained in the first embodiment.

Further, the diameters of the holes 236A and 236B, respectively, of the two plates 242 and 243, of the five plates 242, 243 and 44 to 46, which are stacked on the side of the plate 41 with respect to the plates 44 to 46, are same as a diameter of the hole 36C which is the smallest among the three holes 36C to 36E. In this case, in the five plates 242, 243 and 44 to 46, the diameter of the hole 36E which is the closest to the nozzle 31 does not become too large, as compared with a case of making the hole diameters to be greater in the order from the pressure chamber 30 toward the nozzle 31. Accordingly, it is possible to suppress any occurrence of such a problem, for example, that a hole diameter, of the hole 36E, which is the closest to the nozzle 31 in a certain connecting channel 36 is too large to such an extent of interfering with the hole 36E of another connecting channel 236 adjacent to the certain connecting channel 36 in the paper width direction. Note that in a configuration, in the second embodiment, similar to that in the above-described first embodiment, it is possible to obtain the same effect as that obtained in the first embodiment.

THIRD EMBODIMENT

Next, a head 301 according to a third embodiment of the present disclosure will be explained, with reference to FIGS. 7A and 7B.

As depicted in FIGS. 4B and 6B, the centers of the three holes 36C to 36E constructing each of the enlarged diameter parts 37 and 237, of the first and second embodiments as described above, are coincident with one another. In contrast, centers of three holes 336C to 336E constructing an enlarged diameter part 337 of the head 301 in the third embodiment are not coincident with one another, as depicted in FIGS. 7A and 7B. However, in the three holes 336C to 336E, an entirety of a hole having a smaller diameter of two adjacent holes overlaps in the stacking direction with a hole having a larger diameter of the two adjacent holes. Namely, the entirety of the hole 336D overlaps with the hole 336E in the vertical direction, and the entirety of the hole 336C overlaps with the hole 336D in the vertical direction. Note that constitutive components according to the third embodiment, which are the same as or equivalent to the constitutive components according to each of the first and second embodiments, are designated by the same reference numerals as those of each of the first and second embodiments, any detailed explanation of which will be omitted.

According to the enlarged diameter part 337 in the third embodiment, even in a case that the centers of the three holes 336C to 336E are not coincident with one another, any imbalance or inclination in the difference in hole diameters in the entire circumference of the holes between the two adjacent holes becomes small. Namely, in a stepped part 338C generated due to a difference between a diameter DC of the hole 336C and the diameter DD of the hole 336D, there occurs a difference between a size of a stepped part 338C1 as one stepped part in a shifting direction (deviating direction) in which the center of the hole 336C and the center of the hole 336D are shifted from each other (the conveying direction in the third embodiment) and a size of a stepped part 338C2 as the other stepped part in the deviating direction. Similarly, in a stepped part 338D generated due to a difference between a diameter DD of the hole 336D and the diameter DE of the hole 336E, there occurs a difference between a size of a stepped part 338D1 as one stepped part in a deviating direction in which the center of the hole 336D and the center of the hole 336E are shifted from each other and a size of a stepped part 338D2 as the other stepped part in the deviating direction. However, even in a case that there arises the difference between the size of the one stepped part 338C1 and the size of the other stepped part 338C2, and that there arises the difference between the size of the one stepped part 338D1 and the size of the other stepped part 338D2, the entirety of a hole having a smaller diameter of two adjacent holes overlaps in the vertical direction with a hole having a larger diameter of the two adjacent holes, and thus the stepped part 338C1 and the stepped part 338D1 each of which is generated due to the difference in the hole diameters do not become large to a great extent. As a result, in a case that the liquid droplet is being discharged from the nozzle 31, it is possible to suppress the occurrence of a non-discharge of the ink droplet which would be otherwise occurred, for example, due to the nozzle 31 being clogged by the air bubble.

In the foregoing, although the embodiments of the present disclosure have been explained, the present disclosure is not limited to or restricted by the above-described embodiments; various changes can be made to the present disclosure within the range described in the claims. For example, the enlarged diameter part 37 in the first embodiment may be constructed of three holes 36A to 36C which are formed, respectively, in the three plates 42 to 44. Alternatively, the enlarged diameter part 37 may be constructed of three holes 36B to 36D which are formed, respectively, in the three plates 43 to 45. Still alternatively, the enlarged diameter part 37 may be constructed of three holes 36C to 36E which are formed, respectively, in the three plates 44 to 46. In short, the large diameter part 37 may be constructed of at least three holes in which the hole diameters are enlarged in the order from the pressure chamber 30 toward the nozzle 31.

Further, it is allowable that at least three plates are staked between the plate 41 and the plate 47, and that the plates 42 and 43 are not provided. Not less than six plates may be stacked between the plate 41 and the plate 47.

It is allowable that the diameters DA to DE of the five holes 36A to 36E constructing the enlarged diameter part 37 do not satisfy the relationship: Diameter DB-Diameter DA<Diameter DC-Diameter DB; Diameter DC-Diameter DB<Diameter DD-Diameter DC; and Diameter DD-Diameter DC<Diameter DE-Diameter DD. In short, not less than three holes constructing the enlarged diameter part are enlarged (made to be greater) in the order from the pressure chamber 30 toward the nozzle 31. Alternatively, the diameter DA of the hole 36A formed in the plate 42 may be greater than ½ of (half) the diameter DE of the hole 36E formed in the plate 46.

Further, it is allowable that, in the not less than three holes constructing the enlarged diameter part, a hole having a smaller diameter of two adjacent holes in the stacking direction overlaps partially, not in the entirety thereof, in the vertical direction with a hole having a larger diameter of the two adjacent holes.

The liquid discharging head is not limited to the line system, and may be a serial system (a system in which a head discharges liquid toward an object of discharge while the head is being moved in a scanning direction parallel to the paper width direction).

The object of discharge is not limited to the paper sheet, and may be, for example, cloth (fabric), a substrate, a plastic member, etc.

The liquid discharged from the nozzles is not limited to the ink, and may be any liquid (e.g., a treatment liquid which agglutinates or precipitates constituents of ink, etc.).

It is allowable that any returning route is not formed in the channel member. Namely, it is allowable to provide such a configuration that any liquid circulation is not performed between the ink tank and the common channel.

The present disclosure is applicable also to facsimiles, copy machines, multifunction peripherals, etc., without being limited to printers. Further, the present disclosure is applicable also to a liquid discharge apparatus used for any other application than the image recording (for example, a liquid discharge apparatus which forms an electroconductive pattern by discharging an electroconductive liquid onto a substrate).

What is claimed is:

1. A liquid discharging head, comprising:

a nozzle plate formed with a nozzle;

a pressure chamber plate formed with a pressure chamber; and at least three connecting plates stacked in a stacking direction between the nozzle plate and the pressure chamber plate, the at least three connecting plates being formed with at least three holes which construct a connecting channel connecting the pressure chamber and the nozzle, wherein:

the connecting channel has an enlarged diameter part in which a diameter of the connecting channel is enlarged from the pressure chamber toward the nozzle, the enlarged diameter part is constructed of the at least three holes formed in the at least three connecting plates, diameters of the at least three holes are enlarged in an order from the pressure chamber toward the nozzle, the at least three connecting plates include a connecting plate adjacent to the pressure chamber plate and a connecting plate adjacent to the nozzle plate, the at least three holes include a hole formed in the connecting plate adjacent to the pressure chamber plate and a hole formed in the connecting plate adjacent to the nozzle plate, and a diameter of the hole formed in the connecting plate adjacent to the pressure chamber plate is not more than ½ of a diameter of the hole formed in the connecting plate adjacent to the nozzle plate.

2. The liquid discharging head according to claim 1, wherein at least four connecting plates including the at least three connecting plates are arranged between the nozzle plate and the pressure chamber plate in the stacking direction, the at least four connecting plates include a connecting plate arranged between the pressure chamber plate and the at least three connecting plates, and the connecting plate arranged between the pressure chamber plate and the at least three connecting plates is formed with a hole, of which diameter is same as the smallest diameter of the at least three holes.

3. The liquid discharging head according to claim 1, wherein the enlarged diameter part is formed over an entire length of the connecting channel.

4. The liquid discharging head according to claim 3, wherein the at least three connecting plates include: a first connecting plate adjacent to the nozzle plate; a second connecting plate adjacent to the first connecting plate and sandwiching the first connecting plate between the second connecting plate and the nozzle plate; and a third connecting plate adjacent to the second connecting plate and sandwiching the second connecting plate between the third connecting plate and the first connecting plate, the at least three holes include: a first hole formed in the first connecting plate; a second hole formed in the second connecting plate; and a third hole formed in the third connecting plate, and a value obtained by subtracting a diameter of the second hole from a diameter of the first hole is greater than a value obtained by subtracting a diameter of the third hole from the diameter of the second hole.

5. The liquid discharging head according to claim 1, wherein centers of the at least three holes constructing the enlarged diameter part are not coincident with one another, and in two adjacent holes among the at least three holes, an entirety of a hole having a smaller diameter overlaps with a hole having a larger diameter, in the stacking direction.

* * * * *